UNITED STATES PATENT OFFICE.

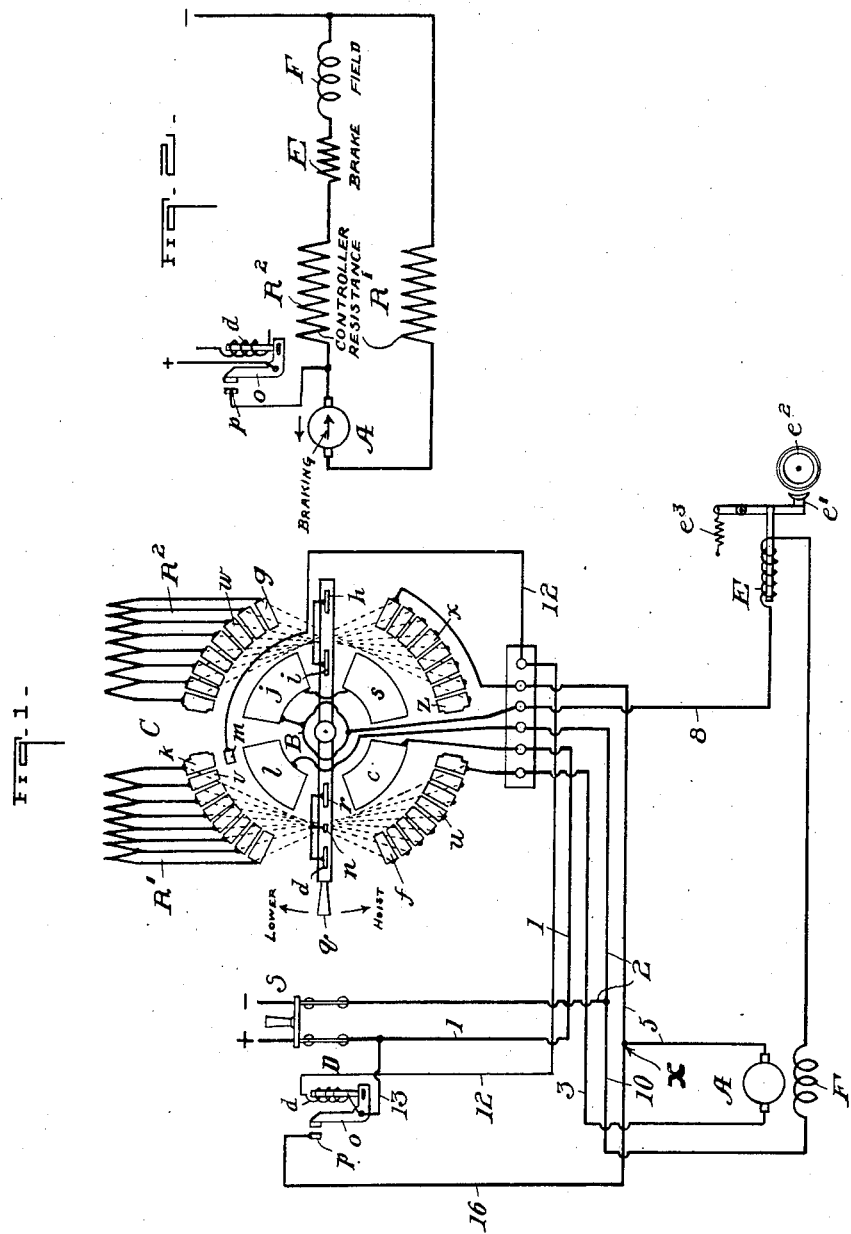

JAY H. HALL AND JAMES F. SCHNABEL, OF NEW YORK, N. Y., ASSIGNORS TO THE ELECTRIC CONTROLLER AND MANUFACTURING COMPANY, OF CLEVELAND, OHIO, A CORPORATION OF OHIO.

CONTROL SYSTEM FOR ELECTRIC HOISTS.

No. 915,290.      Specification of Letters Patent.      Patented March 16, 1909.

Application filed August 10, 1908. Serial No. 447,687.

REISSUED

*To all whom it may concern:*

Be it known that we, JAY H. HALL and JAMES F. SCHNABEL, citizens of the United States, both residing in the city of New York, county and State of New York, have invented or discovered new and useful Improvements in Control Systems for Electric Hoists, of which the following is a specification.

Our invention relates to systems for controlling the speed of an electric motor used for hoisting and lowering loads.

Our invention deals particularly with means for securing a smooth and even lowering of the load, the speed of lowering being under the control of the operator.

Additional objects of our invention are to produce a system of dynamic braking wherein the motor and its load will be promptly brought to rest in case of open circuits in the motor windings and the connections thereto; to produce a system of braking which will be thoroughly reliable and under the control of the operator yet which will dissipate the energy due to lowering the load in the form of heat and will eliminate frictional wear of mechanical brakes ordinarily used for the purpose; to produce a system wherein power may be applied to the motor to start the load down, the application of power being made in such a way that the motor cannot exceed a safe speed notwithstanding the fact that the motor may be drawing power from the line and that gravity at the same time will be acting to accelerate the load downward; to produce a system of power control in hoisting, and braking control in lowering wherein both actions will be controlled by a single operating lever in the simplest possible manner, so that the controller may be safely operated even by an unskilled operator.

In the past, to the best of our knowledge, hoists with dynamic braking action have included a series motor and a shunt wound brake. This type of hoist does not automatically protect itself; that is, when lowering, the series motor may attain an excessive speed and wreck itself. When it is connected in the dynamic braking relation, the motor circuit may open because of broken resistance units or wires, or a trolley wheel may jump the wires. This destroys the dynamic braking force, and, as the shunt brake is on a separate circuit, it may not be applied, thus allowing the load to overhaul the hoisting mechanism and motor at a dangerous speed. Our system by the nature of its connections is self-protective and overcomes the dangerous features just mentioned above. It also removes the heavy flash from the main contact of the controller, when the main circuit is opened during the lowering of the load. This makes the life of the contacts longer and the up-keep of the controller less.

Referring to the accompanying drawings, Figure 1 is a diagrammatic view embodying the preferred form of our invention and Fig. 2 is a simplified diagram of the lowering and braking circuits.

On the drawings, S represents the main double pole switch by which our system is connected to a current supply circuit. The positive pole of the switch S is connected by the wire 1 to the lower left-hand segment $c$ of the controller C, and the negative pole is connected by the wire 2 to the upper left-hand segment $l$ of the controller C. The upper right-hand segment $j$ is connected to one end of the blow-out coil B and to the lower right-hand segment $s$ of the said controller.

Concentric with the segments $c, l, j,$ and $s$ are the four sets $u, v, w, x,$ of controller contacts, the contacts of the sets $v$ and $w$, being respectively connected in the usual manner with the resistance sections $R'$ and $R^2$, and cross-connected respectively with the contacts of the sets $w$ and $x$, as shown on Fig. 1. The last contact of the set $u$ is connected by the wire 3 to one pole of the armature A, the remaining pole being connected by the wire 5 to the first contact of the set $x$ of the controller contacts and also by the wire 16 to the fixed contact $p$ of the magnetic switch D. The remaining pole of the blow-out coil B is connected by the wire 8 to one end of the brake coil E, the remaining end thereof being connected to one end of the field coil F, whose remaining end is connected by the wire 10 to the wire 2.

Between the segment $l$ and the last contact $k$ of the set $v$ is a contact $m$ which is connected by the wire 12 to one end of the winding $d$ of the magnetic switch D, the other end of the winding being connected to the positive side of the controller circuit, as to the branch wire 13 which leads from the wire 1 to the movable contact o of the said switch D.

The controller arm q has on one side of its pivot the three connected contacts d, n, and r; the contact d being arranged to engage the contacts of the sets u and v, the contact n being arranged to engage the contact m, and the contact r being arranged to engage the segments c and l. The controller arm bears on the opposite side of its pivot the connected contacts h and i, the former coöperating with the sets w and x of the controller contacts and the latter with the segments j and s. The brake coil E when energized draws the brake shoe e' away from the drum or shaft $e^2$, which derives rotary motion from the motor in the well known manner. The spring $e^3$ actuates the brake lever so as to apply the shoes e' to the drum or shaft $e^3$ as soon as the winding E is deënergized.

In hoisting, the controller handle is moved in the direction marked hoist; whereupon until the contact d engages the first contact f of the set u of the controller contacts, current is sent through the motor as follows: from the plus side of the switch S, through the wire 1, the segment c, the contacts r and d, the contact f, the contact k, the resistance R', the wire 3, the armature A of the motor, the wire 5, the resistance $R^2$, the contact g, the contacts h and i, the segment j, the blow-out coil B, the wire 8, the coil E of the series brake, the field F and the wires 10 and 2 to the negative side of the main switch S.

To secure a higher speed the controller arm q is moved over the contacts and segments until the last contact is reached when the motor has all of the resistance R' and $R^2$ out of circuit. To stop the motor, the arm q is brought to the off-position, thus cutting the current off from the brake, which thereupon stops the armature and holds it from rotation.

To lower the load the controller arm is moved to the last position of brake side until the fingers d, r and n make connection with contacts k and l and m, whereupon current is established through the coil of the switch D as follows: from the positive side of the switch S through the coil of the switch D, the wire 12, the contact m, the contact n, the contact l, and the wire 2 to the negative side of the switch S. This causes the coil of the switch D to close the contacts o and p, whereupon a circuit is established through the brake and the field coils as follows: from the positive side of the switch S through the contacts o and p of the switch D, the wires 16 and 5, the resistance $R^2$, the contact g, the contact z, the contacts h and i, the segments s and j, the blow-out coil B, the wire 8, the brake coil E, the coil F, and the wires 10 and 2 to the negative side of the switch S. At the same time the latter circuit was established, a circuit was also set up through the armature A as follows: from the point X at the junction of the wires 16 and 5 through the wire 5, the armature A, the wire 3, the resistance R', the contact k, the contacts d and r, the contact l, and the wires 2 to the negative side of the switch S. By this circuit the motor is caused to rotate in a reverse direction from its direction when hoisting, and the load is lowered, its speed being governed by the amount of current which the resistance $R^2$ will allow to flow through the field F. With the resistance $R^2$ properly proportioned the load cannot be lowered at a dangerous speed because the counter E. M. F. of the motor would rise and less current would pass through the armature. The load cannot be lowered at a dangerous speed should any of the wires or resistances of the field circuit break, as the brake sets as soon as its circuit is opened. With the switch D closed, which occurs only when the brush n is on the contact m, the motor opreates as a shunt wound motor. To slow down the load, the controller arm is brought toward the off-position; when the contact n leaves connection with contact m, the switch D being opened because the circuit through its coil is broken at these contacts. The load, acting as the source of power, causes the motor to act as a generator and the circuit through the motor and the brake is then as follows: from the armature A through the wire 5, a part of the resistance $R^2$, the contacts h and i, the segments s and j, the coil B, the wire 8, the series brake coil, the field F, the wires 10 and 2, the segment l, the contacts r and d, a part of resistance R', the wire 3, and the armature A in a direction opposite that taken by the motor when reversing. The load may be further slowed down by moving the controller arm toward the off-position which cuts the resistances R' and $R^2$ out of circuit until the armature is connected directly in series with the field and the brake coils. To stop the motor, the arm q is brought to the off-position, which opens the circuit, the brake being applied by the springs 3 or otherwise. It will be seen that in slowing down the motor it acts as a series wound motor. The field is in series with the armature in all the hoisting positions of the controller.

By referring to Fig. 2, it will be seen that when the switch D is closed during the lowering of the load, the current divides, one branch going through the resistance $R^2$, the brake coil E and the field F and the other through the armature A and the resistance R'. To secure dynamic braking, we open the switch D which cuts off the positive side of line. The armature then sends current in the direction marked "Braking", through the resistance R², the series brake coil E, the field F, and the resistance R' to the other side of the armature. It is thus seen that if, while braking, the resistance, the brake coil, the field or any of the wires connecting them should "open up" for any cause, the current through the brake coil would stop and the brake would be applied. It is also seen that the switch D takes all the arc on its contacts when the lowering or kick-off circuit is broken. This removes the flash from the controller arm and contacts and preserves their life. We have shown only one point which draws current from the line in the lowering direction as this is generally sufficient for most of the cases to which this system may be applied. It is obvious that we could make the controller with more than one point of reverse by lengthening the contact m so that it would be as long as two or three or more contacts.

We claim:—

1. In a control system for electric hoists, an electric motor, a magnetic brake having its releasing winding normally in series with said motor, and a controller arranged to connect the field windings of the motor and the winding of the brake in a circuit containing a resistance and to connect the armature of the motor in another circuit containing a resistance.

2. In a control system for electric hoists, a series wound electric motor, a magnetic brake having its releasing winding normally in series with said motor, and a controller, which, when operated to cause the load to be lowered first connects the armature and the field windings of the motor in parallel paths, each containing a resistance and connects said parallel paths across the supply mains and subsequently disconnects said parallel paths from the supply mains, leaving the armature and field windings of the motor, the winding of the brake, and a resistance connected in a local or dynamic braking circuit.

3. In a control system for electric hoists, a series wound electric motor, a magnetic brake having its releasing winding normally in series with said motor, and a controller, which, when operated to cause the load to be lowered, first connects the armature and the field windings of the motor in parallel paths, each containing a resistance and connects said parallel paths across the supply mains and subsequently disconnects said parallel paths from the supply mains leaving the armature and field windings of the motor, the winding of the brake, and a resistance connected in a local or dynamic braking circuit, said controller being so arranged that the amount of resistance in said local or braking circuit may be varied at will, thereby controlling the speed at which the load is lowered.

4. In a control system for electric hoists, a series wound motor, a brake having a series wound releasing coil, a controller having stationary contacts and a movable member having contacts coöperating therewith, and resistance sections connected to certain of said stationary contacts, the arrangement being such that when the movable member of the controller is moved in one direction from the off-position, the motor and brake windings are connected in series across the supply mains and in series with a resistance in such manner as to cause the motor to hoist the load, further motion of said movable member of the controller reducing said resistance and, when the movable member is moved in the opposite direction from the off-position to a certain limit of travel, the armature and field windings of the motor are connected in parallel circuits across the supply mains, each parallel circuit containing a resistance section, the connections being such as to cause the motor to drive the load downward, the motion of the movable member of the controller toward the off-position then disconnecting said parallel circuits from the supply mains and leaving the windings of the motor and the brake connected in a local or dynamic braking circuit containing a resistance which may be reduced at will by further motion of the movable member of the controller toward the off-position.

5. In a control system for electric hoists, a series wound electric motor, resistances for the same, a magnetic brake having its releasing winding in series with the motor winding, and a controller having means which, when operated to cause the load to be lowered, first connects the armature and field windings of the motor in parallel paths and connects said parallel paths across the supply mains with the resistances in series therewith and leaves the armature and field windings of the motor, the windings of the brake, and a resistance in a local or dynamic braking circuit.

6. In a control system for electric hoists, an electric motor, a controller so arranged that in lowering the load the field winding of the motor will be connected in a circuit containing a resistance and the armature of the motor will be connected in a parallel circuit containing a resistance, thereby starting the load downward, and means for disconnecting the parallel circuits from a supply main, thereby leaving the windings of the motor connected in a local or dynamic braking circuit.

7. In a control system for electric hoists, an electric motor, a controller so arranged that in lowering a load the field winding is connected in a circuit containing a resistance and the armature is connected in a parallel circuit containing a resistance, means for disconnecting the said parallel circuits from the supply main, thereby leaving the windings of the motor connected in a local or dynamic braking circuit, and means for varying at will the amount of resistance in said local or dynamic braking circuit.

Signed at New York, N. Y., this 3rd day of August, 1903.

JAY H. HALL.
JAMES F. SCHNABEL.

Witnesses:
MARY F. GATES,
FRED STADELMAN.